United States Patent [19]

Itoi et al.

[11] Patent Number: 4,999,039
[45] Date of Patent: Mar. 12, 1991

[54] METHOD AND APPARATUS FOR MANUFACTURE OF THIN SHEET GLASS

[75] Inventors: Hideyuki Itoi, Chigasaki; Ryoji Yoshimura, Otsu; Tsuneo Kaizuka, Suita, all of Japan

[73] Assignee: Nippon Electric Glass Co., Ltd., Siga, Japan

[21] Appl. No.: 425,209
[22] PCT Filed: Feb. 22, 1988
[86] PCT No.: PCT/JP88/00188
§ 371 Date: Oct. 17, 1989
§ 102(e) Date: Oct. 17, 1989
[87] PCT Pub. No.: WO89/07580
PCT Pub. Date: Aug. 24, 1989
[51] Int. Cl.$^5$ .................... C03B 23/02; C03B 23/037
[52] U.S. Cl. ........................................ 65/54; 65/106; 65/152; 65/273; 65/275
[58] Field of Search ................ 65/54, 152, 156, 106, 65/268, 273, 275, 286

[56] References Cited
FOREIGN PATENT DOCUMENTS
59-5530  2/1984  Japan .

Primary Examiner—Joye L. Woodard
Attorney, Agent, or Firm—Armstrong, Nikaido, Marmelstein, Kubovcik & Murray

[57] ABSTRACT

First chucks feed material sheets of glass to a heating device and a drawing device. Third chucks hold the first material sheet of glass after it is lowered and the first chucks then release the first material sheet of glass. The first chucks then return to pick up the second material sheet of glass and are then lowered to catch up with the first material sheet of glass. Both material sheets of glass are then heated, softened, fused and bonded. After fusing and bonding, the feed of the second material sheet of glass is continued by the first chucks, which are replaced by the third chucks on the way. Thereafter the same action is repeated for subsequent material sheets of glass, and thin sheet glass is continuously manufactured from the material sheets of glass by a redrawing process.

3 Claims, 5 Drawing Sheets

METHOD AND APPARATUS FOR MANUFACTURE OF THIN SHEET GLASS

BACKGROUND OF THE INVENTION

This invention relates to method and apparatus for manufacture of thin sheet glass by redrawing material sheet glass (glass sheet reforming method).

Thin sheet glass with a thickness of 1 mm or less to be used in liquid crystal display glass, cover glass of a solar battery, cover glass of CCD, cover glass of LED, and others may be warped, bent or creased and poor in surface precision if manufactured by ordinary sheet glass manufacturing methods such as the full course method and the slit-down method. As the thin sheet glass manufacturing method to eliminate such disadvantages, the sheet glass reforming method is known (for example, the Japanese Patent Publication No. 59-4383).

In this sheet glass reforming method, the material sheet glass of a thick wall (for example, thickness of 5 mm) is heated over the softening temperature, and it is drawn to reform the section thinly (e.g. thickness: 0.1 to 0.03 mm). According to this reforming method, by varying the feed speed of the material sheet glass, heating capacity, or pulling speed, a desired sheet thickness will be easily obtained.

The material sheet glass used in this sheet glass reforming method is preliminarily cut to a specific length, and each sheet is fed into the reforming device by chucking its upper end, and therefore the chucked portion is not heated and softened, and the rate of use of the material sheet glass is lowered by that portion. Besides, since the material sheet glass is intermittently fed into the reforming device one by one in a batch system, the temperature of the heating furnace may vary until the next material sheet glass is supplied, and the sheet drawing condition may be discontinuous, and hence it is difficult to obtain a homogeneous thin sheet glass.

SUMMARY OF THE INVENTION

It is hence a primary object of the invention to present a method of manufacturing thin sheet glass by heating the material sheet glass over the softening temperature, and drawing it out, wherein the front end of the next material sheet glass is sequentially fused to the rear end of the preceding material sheet glass in the feeding process.

In this way, the material sheet glass is continuously fed into the reforming device, and is drawn in the same condition. Therefore, loss of material sheet glass, loss time in production, and temperature fluctuations in the heating furnace can be eliminated, and therefore a homogeneous thin sheet glass can be continuously manufactured at a high efficiency.

In this invention, moreover, the upper end of the first material sheet glass is held by a first chuck, and is fed into the drawing process at constant speed while heating the lower end, and during this feed, the upper end of the first material sheet glass is transferred to a third chuck moving at the same speed, and the first chuck is moved back to hold the upper end of the second material sheet glass, and it is brought closer to the first material sheet glass, and the neighboring ends of the two glass sheets are heated and softened, and the lower end of the second material sheet glass is pressed and fused to the upper end of the first material sheet glass through cooperation of holding by a second chuck, and right after fusing, the fused portion is slightly pulled to release the holding of the second chuck and third chuck, and the upper end of the second material sheet glass is held by the first chuck to continue feeding, and during this feed, the upper end of the second material sheet glass is transferred to the third chuck, and thereafter the same action is repeated.

In this constitution, the third chuck holds the upper end of the material sheet glass first held by the first chuck to continue the feed of the same material sheet glass. In this period, the first chuck prepares the next material sheet glass to follow up the preceding material sheet glass.

The second chuck, when fusing the material sheet glass, holds the lower end of the next material sheet glass having its upper end held by the first chuck, and abuts against the upper end of the preceding material sheet glass. Since the material sheet glass is long, the position of the lower end tends to be unstable only when holding the upper end with the first chuck. Accordingly, at least when fusing the next material sheet glass, the second chuck is used for pressing the lower end of the next material sheet glass to the upper end of the preceding material sheet glass accurately. Right after fusing the material sheet glass, the fused portion is slightly pulled, and this is intended to even out the build-up of the thickness caused by mutual fusion of the edges of the two material glass sheets.

When the fusion of material sheet glass is over and the fused portion is hardened to a certain extent in this way, the second and third chucks are released, and only the first chuck is responsible for feeding. In consequence, the second and third chucks elevate, and later the third chuck replaces the first chuck to hold the upper end of the material sheet glass to continue feeding of the material sheet glass. As a result, the first chuck goes up to be ready for the next material sheet glass, and the same action is repeated.

The apparatus for executing this invention is composed as follows.

That is, on the post set up on the machine base are mounted a first chuck for holding and lowering the upper end of the material sheet glass, being installed elevatably through first slide table and elevating means, a second chuck for holding the lower end of material sheet glass, being installed elevatably on the post through second slide table and elevating means beneath the first slide table, a third chuck for holding and lowering the upper end of the material sheet glass by replacing the first chuck, being installed elevatably on the post through third slide table and elevating means beneath the second slide table, a fusing burner for heating and softening the both fusion ends of the material sheet glasses set on the third slide table, a heating device for heating and softening the material sheet glass disposed beneath the third slide table, and a drawing device for drawing the material sheet glass placed beneath the heating device, wherein during feed of the material sheet glass by the first chuck, it is changed to the third chuck to continue feeding of the material sheet glass, and during feed of the material sheet glass by the third chuck, the feeding preparation and fusion of the next material sheet glass are effected by the first chuck and second chuck.

DETAILED DESCRIPTION OF THE PREFERRED EMBODIMENT

Figure 1:
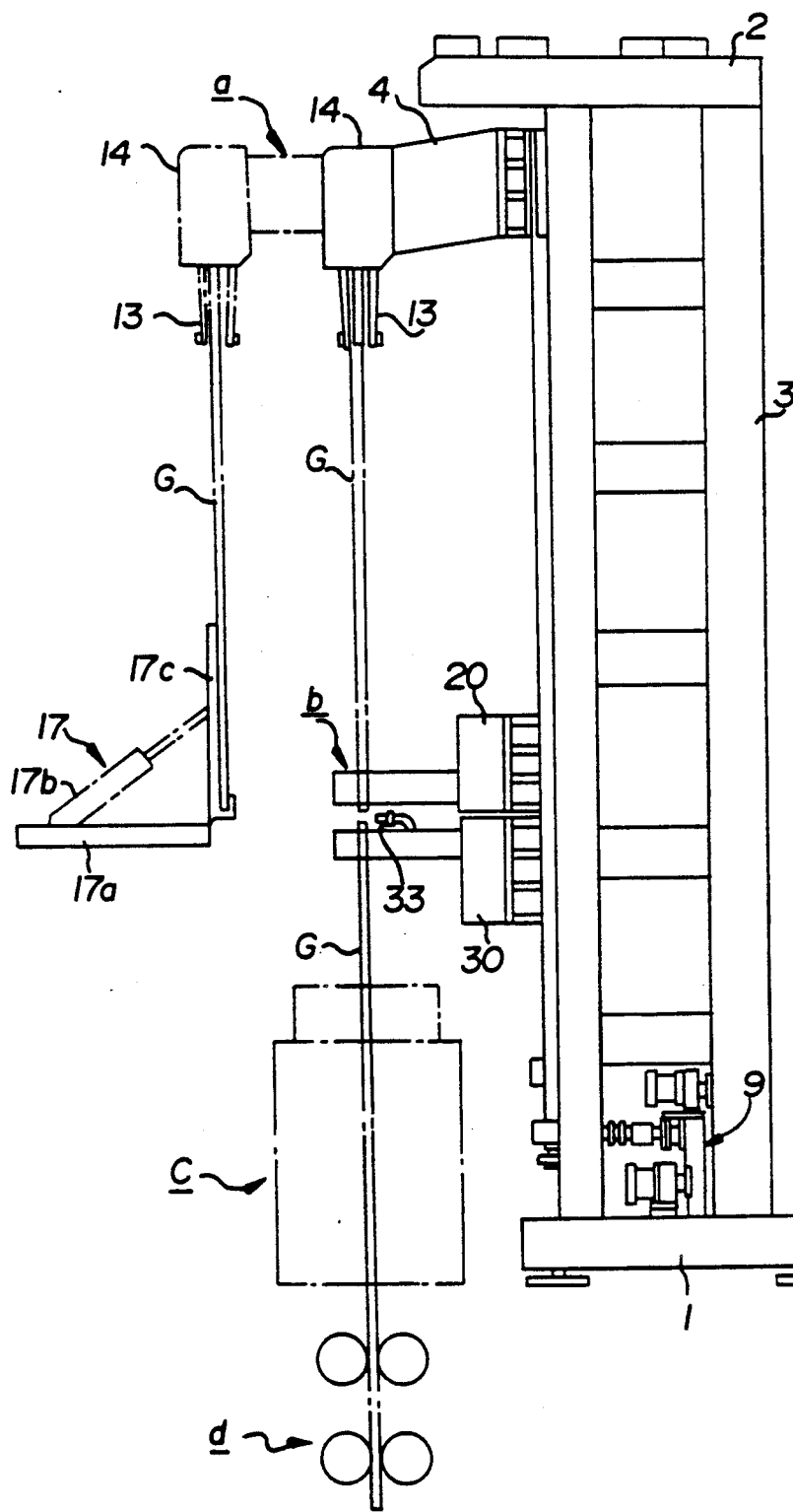
FIG. 1 is a side view of an apparatus of the invention.

Referring now to the drawings, the apparatus for executing the method of the invention is described in detail below. That is, the apparatus is composed of a material sheet feed device a, end fusing device b, heating device c, and drawing device d which are arranged in a vertical row, and it is desired to obtain arbitrary drawing conditions by controlling the individual driving devices of the material sheet feed device a and drawing device d.

The material sheet feed device a for feeding the material sheet glass G downward has a machine base 1 and a machine head 2 bonded and fixed at a specific interval by means of a post 3 to compose a machine frame. Along this post 3, a ball screw 5 engaged with a first slide table 4 is inserted between the machine base 1 and machine head 2. The upper end of the ball screw 5 is borne by a bearing 6 of the machine head 2, while the lower end penetrates through a bearing 7 of the machine base 1 to project out, thereby causing a gear 8 at the lower end to be engaged with a gear 10 of a driving device 9. By controlling the driving device 9, the slide table 4 engaged with the ball screw 5 ascends or descends at specific speed along the post 3.

Figure 3:
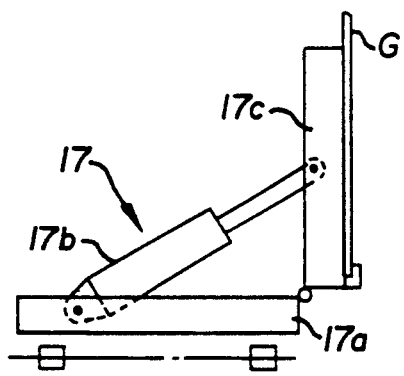
FIG. 3 is an outline sectional view of a loader.

The first slide table 4 possesses an air cylinder 15 for opening and closing a chuck arm 14 integrally forming a first chuck 13 for holding the upper end of the material sheet glass G. This chuck arm 14 moves longitudinally in the horizontal direction by means of a motor 16 with respect to the first slide table 4, and the forward position is the delivery position of the material sheet glass G and the rear position is the specified feed position. Beneath the delivery position, a loader 17 is installed. This loader 17 comprises, as shown in FIG. 3, an elevating table 17a, and a hoisting table 17c being hoisted by a cylinder 17b on this elevating table 17a, and it is designed to set upright the material sheet glass G being conveyed in the horizontal position, and elevate and insert into the first chuck 13.

Next, relating to the end fusing device b, this device b comprises a second slide table 20 and a third slide table 30, and these slide tables 20, 30 are engaged with ball screws 23, 23a driven by a similar driving device as used in the first slide table 4 so as to be capable of ascending and descending along the post 3, and on the slide tables 20, 30 are mounted moving tables 24, 25, 35, 36 having a pair of second chucks 21, 22 and a pair of third chucks 31, 32 for holding the both ends of the material sheet glass G so as to be movable to be closer to and remoter from the both sides of the material sheet glass G by means of air cylinders 26, 27, 37, 38; and the second chucks 21, 22 and third chucks 31, 32 are opened and closed by air cylinders 28, 29, 39, 40. Or by omitting the moving tables 24, 25, 35, 36, the second chucks 21, 22 and third chucks 31, 32 may be directly mounted on the slide tables 20, 30.

On the third slide table 30, a fusion burner 33 for heating the end of the material sheet glass G is integrally fixed.

Figure 4:
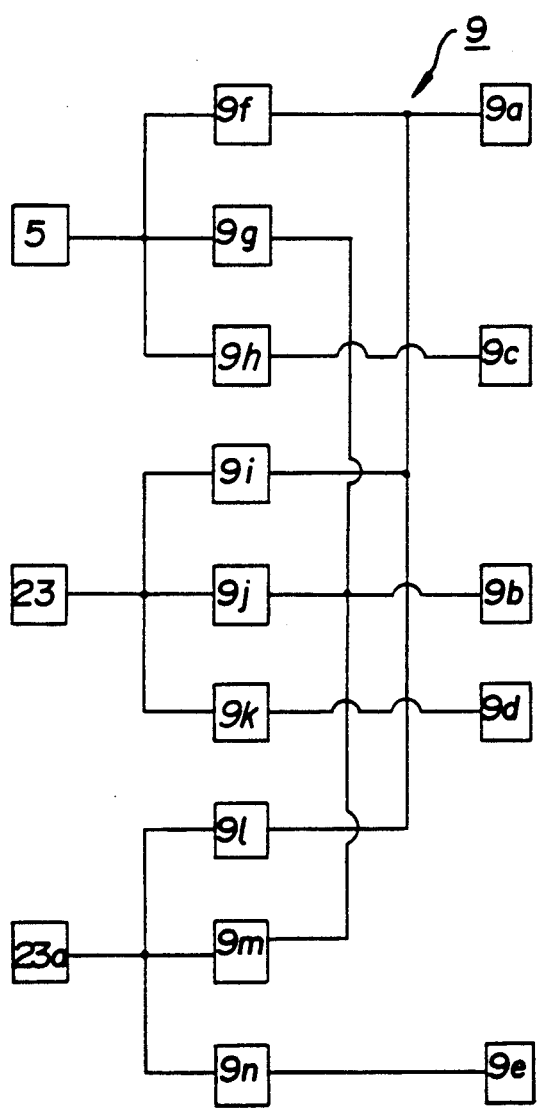
FIG. 4 is an outline explanatory drawing of a driving device for each slide table.

The ball screws 5, 23, 23a for elevating the first to third slide tables 4, 20, 30 can be driven by mutually independent motors, but for the case of mutually synchronous actions, the driving device 9 uses, as shown in FIG. 4, two motors 9a, 9b for lowering action, and three motors 9c, 9d, 9e for raising action, and clutches 9f to 9n are provided by three pieces each for the motors 9a, 9b, 9c, 9d, 9e so as to be selected.

The motor 9a always rotates at a same speed, and feeds the material sheet glass G into the heating device C at a specific speed (e.g. 120 mm/min).

The motor 9b is for varying the feed speed of the material sheet glass G in each process, and it rotates at a higher speed than the motor 9a.

The motors 9c, 9d, 9e are for ascending motion only, and are designed to raise the slide tables 4, 20, 30 at high speed.

On the shafts of the ball screws 5, 23, 23a, an encoder for measuring the moving speed (not shown) and an encoder for measuring the moving distance (not shown) are mounted.

Figure 5:
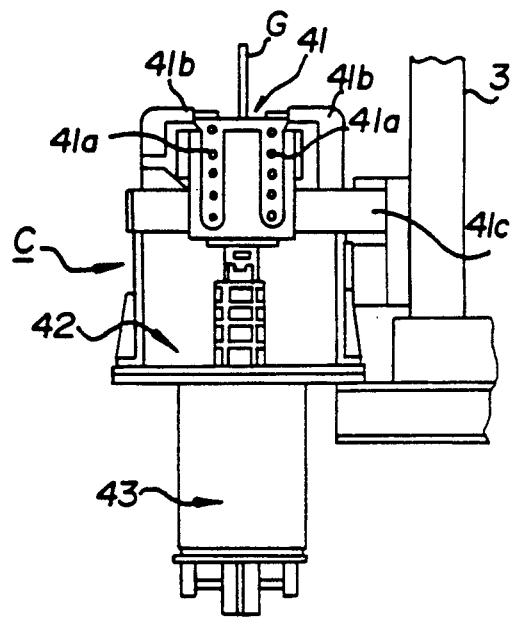
FIG. 5 is an outline side view of a heating device.

The heating device C consists of, as shown in FIG. 5, an elevatable bonding furnace 41, a stationary forming furnace 42 and an annealing furnace 43.

The bonding furnace 41 is for insulating the fused portion of the material sheet glass G, and a plurality of heating elements 41a are disposed opposingly on both sides of the material sheet glass G, and these heating elements 41a are mounted on a support arm 41c by way of the support member 41b, and this support arm 41c is elevated and driven by an exclusive elevating device (not shown; along the post 3.

Figure 6:
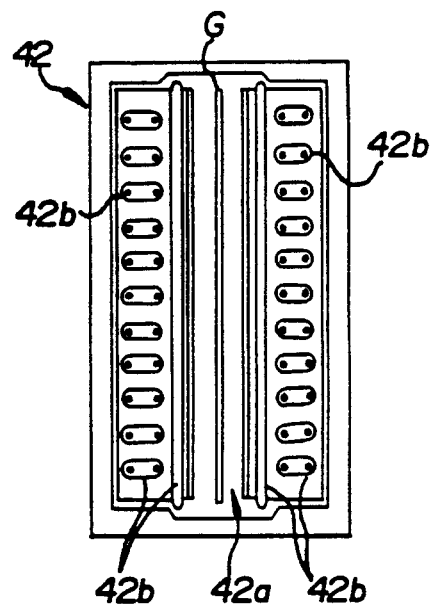
FIG. 6 is a plan view of essential parts of the heating device.

The forming furnace 42, as shown in FIG. 6, has a slit 42a through which the material sheet glass G penetrates disposed in the middle position, and heating elements 42b are disposed so as to be opposite to both sides of the material sheet glass G passing through this slit 42a, and these heating elements 42b are arranged at small pitches so as to control the heating temperature in the widthwise direction of the material sheet glass G, and are fixed and installed on the floor on the whole.

The annealing furnace 43 is continuously disposed to the lower part of the forming furnace 42, which prevents the material sheet glass G heated up to the softening temperature in the forming furnace 42 from being cooled abruptly in order to cool gradually, and structurally it is similar to the forming furnace 42, except that the density of arrangement of the heating elements is coarse in the feed direction of the material sheet glass G.

In the lower part of the heating device c, the drawing device d having rollers for pulling the softened material sheet glass G by force is arranged in the vertical row.

The operation of the thus composed apparatus is explained below.

Figure 7A:
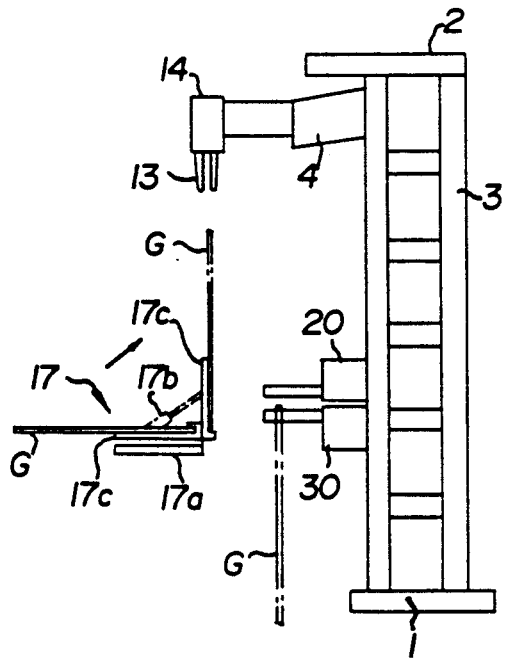
FIG. 7A to FIG. 7E are explanatory drawings from the material glass delivery process to the process immediately before fusion.
Figure 7B:
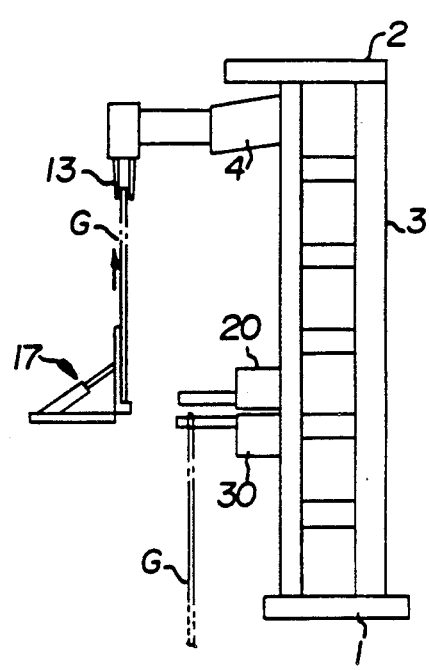
Figure 7C:
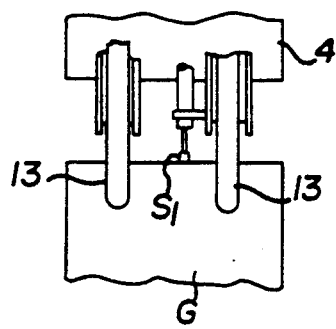

First of all, as shown in FIG. 7A, the material sheet glass G is inserted into the loader 17 in the horizontal position to be held, and the hoisting table 17c is raised upright by the cylinder 17b, and the material sheet glass G is set up vertically. The configuration at this time is that the first chuck 13 is at the forward delivery position, and that the material sheet glass G set upright by the hoisting table 17c is immediately beneath the first chuck 13. In this state, as shown in FIG. 7B, the elevating table 17a of the loader 17 is raised by a specific distance by the elevating cylinder (not shown), and the upper end of the material sheet glass G is inserted into the first chuck 13. At this time, the dimensions of the material sheet glass G being delivered are somewhat variable, and in order to fuse such material sheet glass G accurately, it is necessary to measure the position of the holding point accurately so as to hold securely without deviation. Here, the first chuck 13 is lowered as shown in FIG. 7C, and when the end of a length measuring sensor S1 fitted to the first slide table 4 touches the upper end of the material sheet glass G and is pushed in by a preset amount, lowering of the first chuck 13 stops. The motor used at this time is 9b. Besides, since the first chuck 13 overruns somewhat, the difference between the value of the length measuring sensor S1 and the set value is stored. In succession, by the air cylinder 15, the first chuck 13 is closed, and the upper end of the material sheet glass G is held. As a result, the loader 17 releases the holding of the material sheet glass, and then descends, and raises the hoisting table 17c to be ready for delivery of the next material sheet glass G. On the other hand, the first chuck 13 withdraws to the backward position horizontally by means of the motor 16, and descends at high speed by means of the motor 9b until the lower end of the material sheet glass G reaches the heating device C, when the operation is changed over to the constant speed descending by the motor 9a. At this point, the second chucks 21, 22, and the third chucks 31, 32 are waiting at the ascending end. The ascending end of the second chucks 21, 22 and third chucks 31, 32 is set at a proper position between the ascending end and descending end of the first chuck, for example, near the middle position.

Figure 7D:
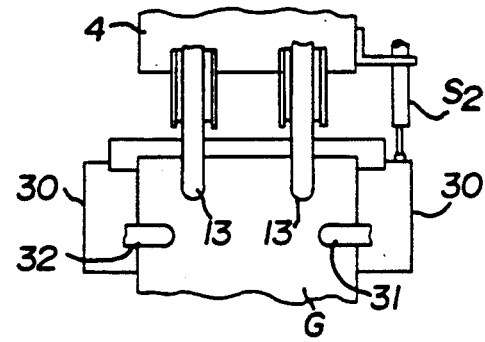

In this situation, while the first chuck 13 is holding the upper end of the material sheet glass G at a specific descending speed by the motor 9a to feed into the heating device C, a length measuring sensor S2 fitted to the first slide table 4 touches the upper end of the third slide table 30 as shown in FIG. 7D and is pushed in by a preset extent, when the center of the fusing burner 33 and the upper end position of the material sheet glass G held by the third chucks 31, 32 are matched theoretically.

When the length measuring sensor S2 is pushed in by a preset extent in this way, the second chucks 21, 22 and third chucks 31, 32 are lowered by a speed synchronized with the first chuck 13 by means of the motor 9a, and in this descending process, the upper end of the material sheet glass G is held by the third chucks 31, 32. The holding position by the third chucks 31, 32 is designed in such a manner as to hold, after correcting the stored value of the difference of the value of the length measuring sensor S1 and the set value as the first chuck 13 overruns in FIG. 7B, so as to diminish the effect of overrun of the first chuck 13 when holding the upper end of the material sheet glass G.

Figure 7E:
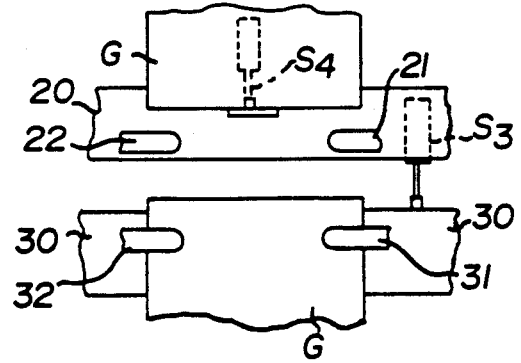

In this way, when the upper end of the material sheet glass G is held by the third chucks 31, 32, the first chuck 13 is released and ascends at high speed by means of the motor 9c to be ready for feed of the next material sheet glass G. On the other hand, the third chucks 31, 32 descend at a specific speed by means of the motor 9a, and the material sheet glass G is supplied into the heating device C. At this time, the second chucks 21, 22 remain in a released state, and descend at a synchronous speed with the third chucks 31, 32 by means of the motor 9a, and in this descending stroke, the distance up to the upper end of the third slide table 30, that is, the distance between the second chucks 21, 22 and third chucks 31, 32 is measured by a length measuring sensor S3 mounted on the second slide table 20 as shown in FIG. 7E, and the difference from the set value is stored.

In this way, while the third chucks 31, 32 are feeding the material sheet glass G into the heating device C, the first chuck operates as explained in FIG. 7A to FIG. 7C, and receives the next material sheet glass G from the loader 17, thereby waiting at the delivery position ahead of the first slide table 4. When the second chucks 21, 22 descend to a certain position, the first chuck 13 moves to the backward position, and then descends at high speed by means of the motor 9b. As a result, the lower end of the material sheet glass G approaches the upper end of the preceding material sheet glass G. The high speed descending of the next material sheet glass G is changed over to specific speed descending by the motor 9b as the lower end pushes a length measuring sensor S4 of the second slide table 20 to the set value as shown in FIG. 7E, and the first chuck 13 descends at a specific speed synchronized with the second chucks 21, 22 and third chucks 31, 32. At this time, if the first chuck 13 overruns beyond the set value of the length measuring sensor S4, it is immediately corrected.

By the above action, the positions of the upper end of the preceding material sheet glass G and the lower end of the next material sheet glass G are accurately detected, and the gap of the two glasses G, G is accurately obtained by the internal arithmetic operation of the control device (not shown).

Once the gap is determined, only the first chuck 13 out of the first to third chucks 13, 21, 22, 31, 32 descending at a specific speed synchronized by the motor 9a is changed over to the motor 9b, and the gap of the two glasses G, G is reduced to the set value (e.g. 20 mm).

When the gap is reduced to the set value, the first chuck 13 is changed over to the motor 9a, and descends at a specific speed synchronous with the second to third chucks 21, 22, 31, 32. In succession, the second chucks 21, 22 close, and hold the lower end of the next material sheet glass G. When the third chucks 31, 32 descend to the specific position, the operation enters into the sealing process. Or, the sealing process may be started immediately after once measuring the gap. In the sealing process, the first chuck 13 and the second chucks 21, 22 descend at high speed in synchronism by means of the motor 9b, and this gap is reduced to the set value (e.g. 2 mm), and the motor is changed over to 9a again, and they descend at a specific speed synchronous with the third chucks 31, 32. At this moment, the fusing burner 33 is ignited, and approaches to heat and soften the edges to be fused of the both glasses G, G. Consequently, the first chuck 13 and the second chucks 21, 22 are lowered at high speed by the motor 9b. This is in consideration of the gap mentioned above, and high speed descending is effected for the portion necessary for fusion of the edges of the both glasses G, G, and the operation is immediately changed over to the motor 9a so as to lower at a specific speed synchronous with the third chucks 31, 32. Consequently, the first chuck 13 and second chucks 21, 22 are momentarily stopped of lowering action, and thereafter they are lowered at specific speed synchronous with the third chucks 31, 32.

Figure 8A:
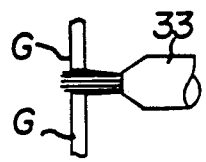
FIG. 8a to FIG. 8d are explanatory drawings of the fusion process.
Figure 8B:
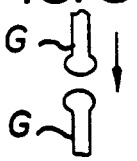
Figure 8C:
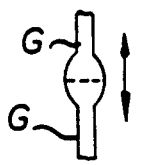
Figure 8D:
Figure 2:
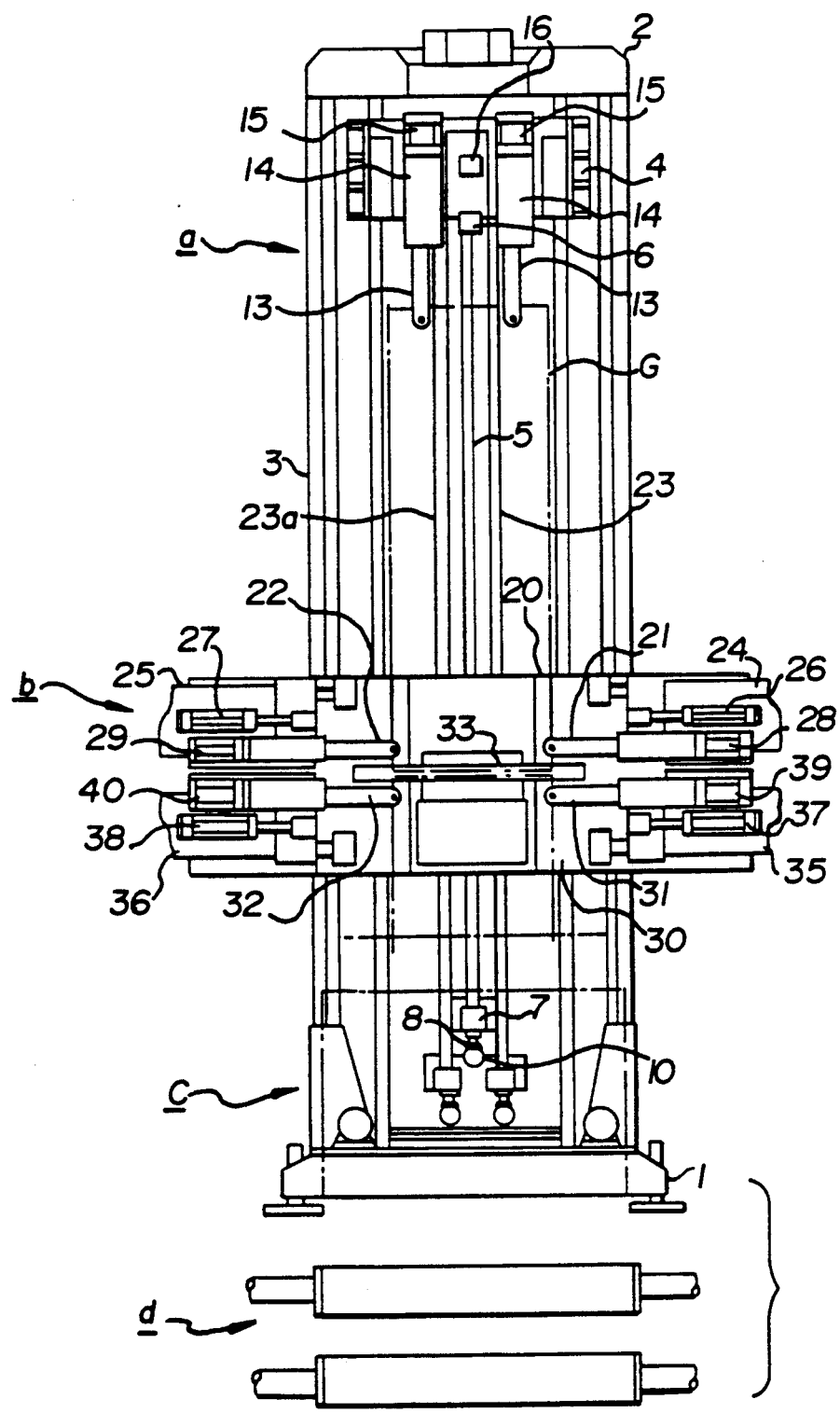
FIG. 2 is a front view of the apparatus of FIG. 1.

In the above process, as shown in FIG. 8a, the edges of the material sheet glasses G, G are heated and softened by the fusing burner 33, and are fused together by bringing them closer to each other as shown in FIG. 8b, and thereafter the feed of the upper side material sheet glass G is stopped momentarily as shown in FIG. 8c, and the upper and lower material sheet glasses G, G are once pressed, and then pulled somewhat, and by this action, the built-up thickness of the glass fusion part becomes smooth as shown in FIG. 8b, and the dimensional fluctuation of the sheet after redrawing diminishes.

When the fusion is thus over, the second chucks 21, 22 and the third chucks 31, 32 open, and return to the intermediate position to wait. The bonding furnace 41 of the heating device C ascends, after completion of fusion, so as to follow up the second chucks 21, 22 and third chucks 31, 32 so as not to cool the fused portion.

The material sheet glass G to which the next material sheet glass G is fused in this way is held by the first chuck 13, and is sent into the heating device c at a specific speed, so that the fusion portion is also fed at the specific speed. At this time, the elevated bonding furnace 41 of the heating device C is lowered at synchronous speed to maintain the fused portion at a constant temperature. Afterwards, the material sheet glass G is fed into the heating device c at the specific speed, and is heated and softened in the forming furnace 42, and is gradually cooled in the annealing furnace 43, and is continuously redrawn into thin sheet glass of specified thickness by the drawing device (d).

Figure 9:
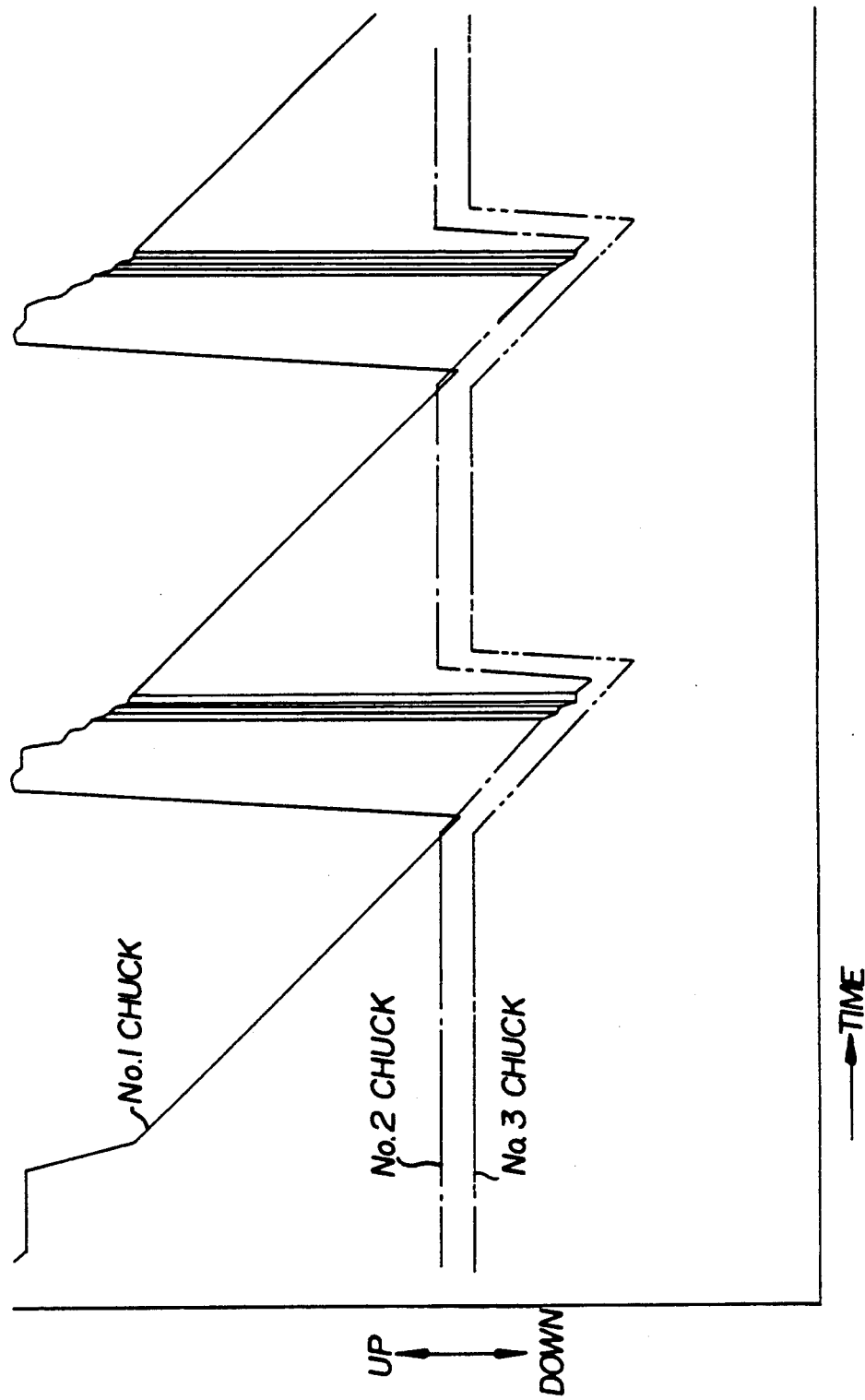
FIG. 9 is an example of a time chart at chuck points of the first to third slide tables.

In this process, when the first slide table 4 held by the first chuck 13 approaches up to the position of the second slide table 20 waiting at the intermediate position, the second slide table 20 and the third slide table 30 descend in synchronization with the first slide table 4, and in this period the third chucks 31, 32 hold the material sheet glass G, and the first chuck 13 opens, and the first slide table 4 quickly returns to the upper end. However, the second slide table 20 and third slide table 30 continue to descend at the specific speed, and in this period the next material sheet glass G is held by the first chuck 13, and the first slide table 4 begins to descend at a fast speed enough to catch up with the second slide table 20 and third slide table 30, and the same fusion action is effected. Thereafter the same action is repeated, and thin sheet glass is continuously manufactured. FIG. 9 is an example of a time chart at chuck points of the first to third slide tables. In FIG. 9, the descending end position of the first slide table overlaps with the ascending end position of the second slide table, and this is because it is expressed at the position of the chuck point of the first chuck 13.

What is claimed is:

1. A method for manufacturing thin sheet glass comprising the steps of: heating and fusing the front end of a first material sheet of glass to the rear end of a second material sheet of glass, and sequentially heating the fused second and first material sheets of glass above the softening temperature of the glass and drawing the second and first sheets of glass.

2. A method for continuously manufacturing thin sheet glass comprising the steps of: feeding a first material sheet of glass to a heating location at a specific speed while holding an upper end of said first material sheet of glass with a first chuck and heating a lower end of the first material sheet of glass, gripping the upper end of the first material sheet of glass with a third chuck moving at the specific speed, releasing the first chuck and moving the first chuck back to a raised position to hold the upper end of a second material sheet of glass, moving the first chuck to a location above the first material sheet of glass to heat and soften the adjacent ends of the first and second material sheets of glass, gripping the second material sheet of glass with a second chuck and pressing and fusing the lower softened end of the second material sheet of glass to the upper softened end of the first material sheet of glass to form a fused portion, slightly pulling the first and second material sheets of glass in opposite directions to reduce the thickness of the fused portion immediately after the fusing step, releasing the second chuck and the third chuck while continuing to feed the fused first and second sheets using the first chuck to hold the upper end of the second material sheet of glass, gripping the upper end of the second material sheet of glass with the third chuck and releasing the first chuck while continuing feeding the fused first and second material sheets to the heating location, heating said fused sheets at the heating location above the softening temperature of the glass, and drawing the heated fused first and second material sheets of glass; and repeating the above steps to sequentially draw a plurality of material sheets of glass.

3. A manufacturing apparatus for forming thin sheet glass from a plurality of material sheets of glass, comprising:
   a post connected to a machine base;
   a first slide table movably supported by the post;
   first elevating means for moving the first slide table relative to the post;
   a first chuck means mounted on the first slide table for movement therewith, for holding an upper end of a first material sheet of glass;
   a second slide table movably supported by the post;
   second elevating means for moving the second slide table relative to the post;
   a second chuck means mounted on the second slide table for movement therewith, for holding a lower end of the first material sheet of glass,
   a third slide table beneath the second slide table, the third slide table being movably supported by the post;
   third elevating means for moving the third slide table relative to the post;
   a third chuck means mounted on the third slide table, for holding the upper end of the first material sheet of glass after release of the first chuck means;
   a fusion burner for heating and softening the adjacent upper and lower ends of the material sheets of glass gripped by the first, second and third chuck means;
   a heating means for heating and softening the fused material sheets of glass disposed beneath the third slide table; and
   a drawing means beneath the heating means for drawing the heated and softened fused sheets of glass, and
   control means for controlling (a) feeding of the material sheets of glass by the first chuck means, (b) transfer of support of the material sheets of glass from the first chuck means to the third chuck means for continuous feeding of the material sheets of glass, (c) feeding of the material sheets of glass by the third chuck means, and (d) gripping of the material sheets of glass by both the first and second chuck means during fusing of adjacent ends of the material sheets of glass.

* * * * *